(12) United States Patent
Eek et al.

(10) Patent No.: US 12,338,745 B2
(45) Date of Patent: *Jun. 24, 2025

(54) TOOL FOR ALIGNMENT OF SEAL SEGMENTS

(71) Applicant: SIEMENS ENERGY GLOBAL GMBH & CO. KG, Munich (DE)

(72) Inventors: Dennis Eek, Åby (SE); Daniel Silfver, Norrköping (SE); Erik Björklund, Norrköping (SE); Thomas Widgren, Grytgöl (SE); Mikael Frejd, Norrköping (SE); Johan Nilsson, Skärblacka (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,028

(22) Filed: Jul. 26, 2024

(65) Prior Publication Data

US 2024/0384669 A1 Nov. 21, 2024

Related U.S. Application Data

(62) Division of application No. 18/024,298, filed as application No. PCT/US2021/046704 on Aug. 19, 2021.

(Continued)

(51) Int. Cl.
*F01D 25/28* (2006.01)
*F01D 11/02* (2006.01)
(Continued)

(52) U.S. Cl.
CPC .............. *F01D 25/28* (2013.01); *F01D 11/02* (2013.01); *F01D 25/243* (2013.01); *B23P 19/10* (2013.01);
(Continued)

(58) Field of Classification Search
CPC ........ F01D 25/28; F01D 25/285; F01D 11/02; F01D 25/246; F05D 2230/64; F05D 2230/644; F05D 2260/83; F16J 15/44; F16J 15/443; F16J 15/447; F16J 15/4472; F16J 15/184; F16J 15/187; F16J 15/3268;
(Continued)

(56) References Cited

U.S. PATENT DOCUMENTS 6,263,764 B1 * 7/2001 Steinbock ............... F16B 31/04
  81/57.38
6,560,836 B1 * 5/2003 Briscoe ................... B25B 27/16
  29/259

(Continued)

FOREIGN PATENT DOCUMENTS

EP 3293370 B1 3/2018

*Primary Examiner* — David E Sosnowski
*Assistant Examiner* — Arthur Paul Golik

(57) ABSTRACT

An alignment tool includes a mounting flange, a support leg fixedly coupled to the mounting flange and cooperating with the mounting flange to define a partial annular ring that extends in an arc between 190 degrees and 350 degrees, and a second quantity of jack bolt pairs movably coupled to the support leg, each jack bolt pair arranged to engage one of the first quantity of seal segments. A third quantity of mounting fasteners is positioned to fixedly attach the mounting flange to the inner casing.

7 Claims, 6 Drawing Sheets

Related U.S. Application Data

(60) Provisional application No. 63/073,496, filed on Sep. 2, 2020.

(51) Int. Cl.

| | | |
|---|---|---|
| *F01D 25/24* | (2006.01) | |
| *B23P 19/10* | (2006.01) | |
| *B23P 19/12* | (2006.01) | |
| *B25B 1/08* | (2006.01) | |
| *B25B 1/10* | (2006.01) | |
| *B25B 1/14* | (2006.01) | |
| *B25B 3/00* | (2006.01) | |
| *B25B 5/02* | (2006.01) | |
| *B25B 5/06* | (2006.01) | |
| *B25B 5/10* | (2006.01) | |
| *F16J 15/18* | (2006.01) | |
| *F16J 15/3268* | (2016.01) | |
| *F16J 15/44* | (2006.01) | |
| *F16J 15/447* | (2006.01) | |

(52) U.S. Cl.
CPC ............. *B23P 19/12* (2013.01); *B25B 1/08* (2013.01); *B25B 1/10* (2013.01); *B25B 1/14* (2013.01); *B25B 3/00* (2013.01); *B25B 5/02* (2013.01); *B25B 5/067* (2013.01); *B25B 5/10* (2013.01); *B25B 5/101* (2013.01); *F01D 25/246* (2013.01); *F01D 25/285* (2013.01); *F05D 2230/64* (2013.01); *F05D 2230/644* (2013.01); *F05D 2260/31* (2013.01); *F05D 2260/83* (2013.01); *F16J 15/184* (2013.01); *F16J 15/187* (2013.01); *F16J 15/3268* (2013.01); *F16J 15/44* (2013.01); *F16J 15/443* (2013.01); *F16J 15/447* (2013.01); *F16J 15/4472* (2013.01)

(58) Field of Classification Search
CPC .... B25B 1/10; B25B 1/14; B25B 5/02; B25B 5/067; B25B 5/101; B25B 1/08; B25B 3/00; B25B 5/10; B23P 19/10; B23P 19/12
USPC ...... 269/246, 228, 53, 54.5, 76, 143; 29/271
See application file for complete search history.

(56) References Cited

U.S. PATENT DOCUMENTS

| | | | |
|---|---|---|---|
| 2002/0197147 A1* | 12/2002 | Kawai | F01D 25/28 |
| | | | 415/1 |
| 2015/0224611 A1 | 8/2015 | Wojciechowski et al. | |
| 2022/0034231 A1* | 2/2022 | Dupeyre | F01D 5/225 |
| 2022/0195894 A1* | 6/2022 | Quennehen | F01D 25/12 |

\* cited by examiner

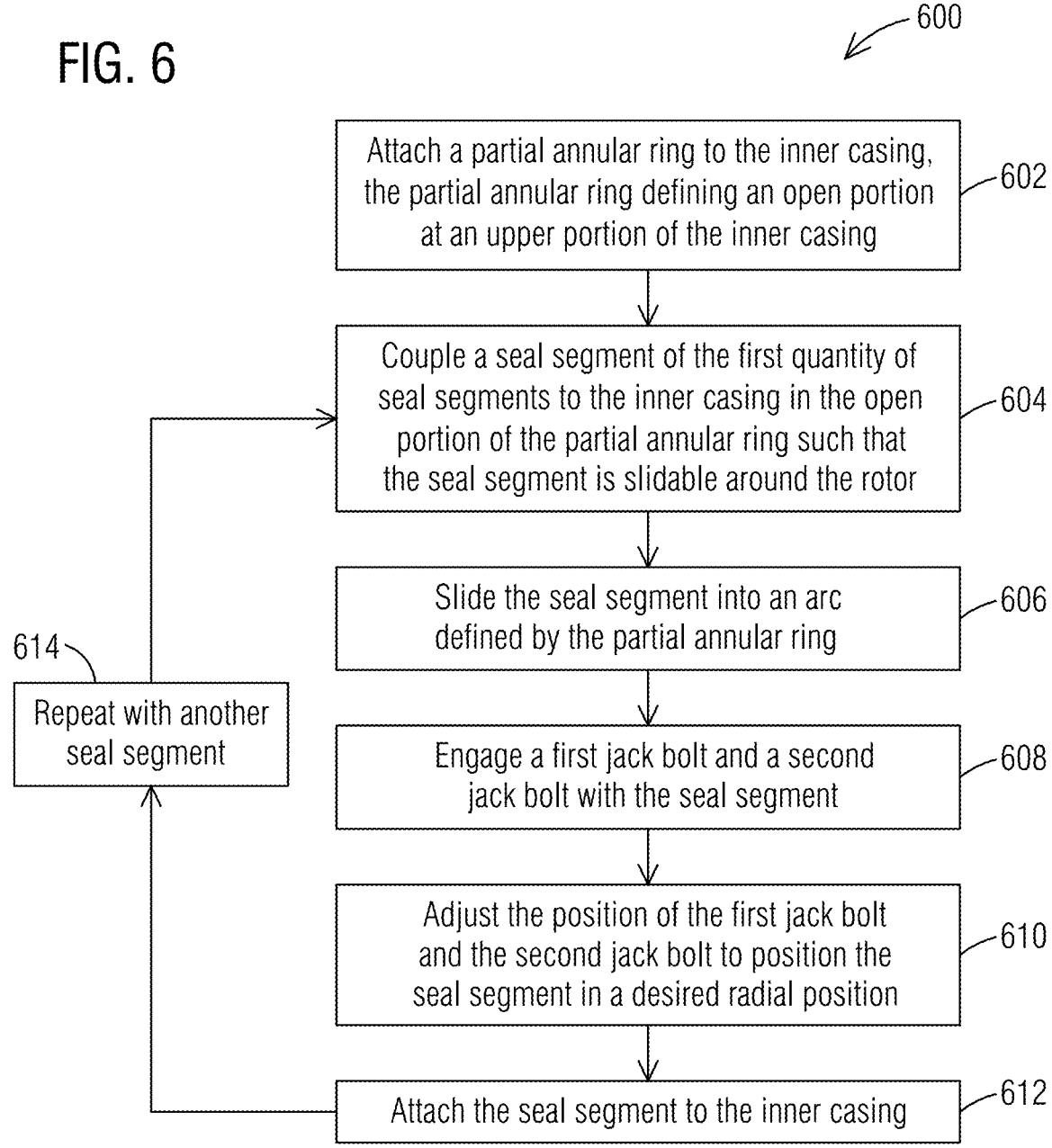

TOOL FOR ALIGNMENT OF SEAL SEGMENTS

BACKGROUND

Turbines, including combustion turbines may include internal seal assemblies that are difficult to properly align. To address this, often inferior seal designs are employed. These designs allow easier assembly as they do not have any radial interference and can therefore be moved axially. In this situation, full labyrinth seals cannot be used.

BRIEF SUMMARY

In one construction, an alignment tool for assembling a center seal having a first quantity of seal segments is described. The center seal is arranged to form a seal between an inner casing and a rotor. The alignment tool includes a mounting flange, a support leg fixedly coupled to the mounting flange and cooperating with the mounting flange to define a partial annular ring that extends in an arc between 190 degrees and 350 degrees, and a second quantity of jack bolt pairs movably coupled to the support leg, each jack bolt pair arranged to engage one of the first quantity of seal segments. A third quantity of mounting fasteners is positioned to fixedly attach the mounting flange to the inner casing.

In another construction, a method of attaching a center seal having a first quantity of seal segments to an inner casing to form a seal between the inner casing and a rotor includes attaching a partial annular ring to the inner casing, the partial annular ring defining an open portion at an upper portion if the inner casing. The method also includes coupling a first seal segment of the first quantity of seal segments to the inner casing in the open portion of the partial annular ring such that the first seal segment is slidable around the rotor and sliding the first seal segment into an arc defined by the partial annular ring. The method further includes engaging a first jack bolt and a second jack bolt with the first seal segment, adjusting the position of the first jack bolt and the second jack bolt to position the first seal segment in a desired radial position, and attaching the first seal segment to the inner casing.

In another construction, an apparatus is arranged to form a seal between an inner casing and a rotor. The apparatus includes a plurality of seal segments, each seal segment arranged to define a partial arc that extends around a portion of the rotational axis of the rotor and includes a first hook having an open portion facing the rotational axis and arranged to engage a second hook coupled to the inner casing. The apparatus also includes an alignment tool removably connected to the inner casing, the alignment tool including a partial annular ring that extends in an arc between 190 degrees and 350 degrees. A plurality of jack bolt pairs is movably coupled to the alignment tool. Each jack bolt pair is arranged to engage one of the seal segments of the plurality of seal segments to position the seal segment in a desired radial position with respect to the rotor, and a plurality of fasteners are arranged to removable connect each seal segment of the plurality of seal segments to the inner casing.

BRIEF DESCRIPTION OF THE DRAWINGS

To easily identify the discussion of any particular element or act, the most significant digit or digits in a reference number refer to the figure number in which that element is first introduced.

FIG. 6 is a flow chart describing an alignment process 600 for the center seal of FIG. 3.

DETAILED DESCRIPTION

Figure 1:
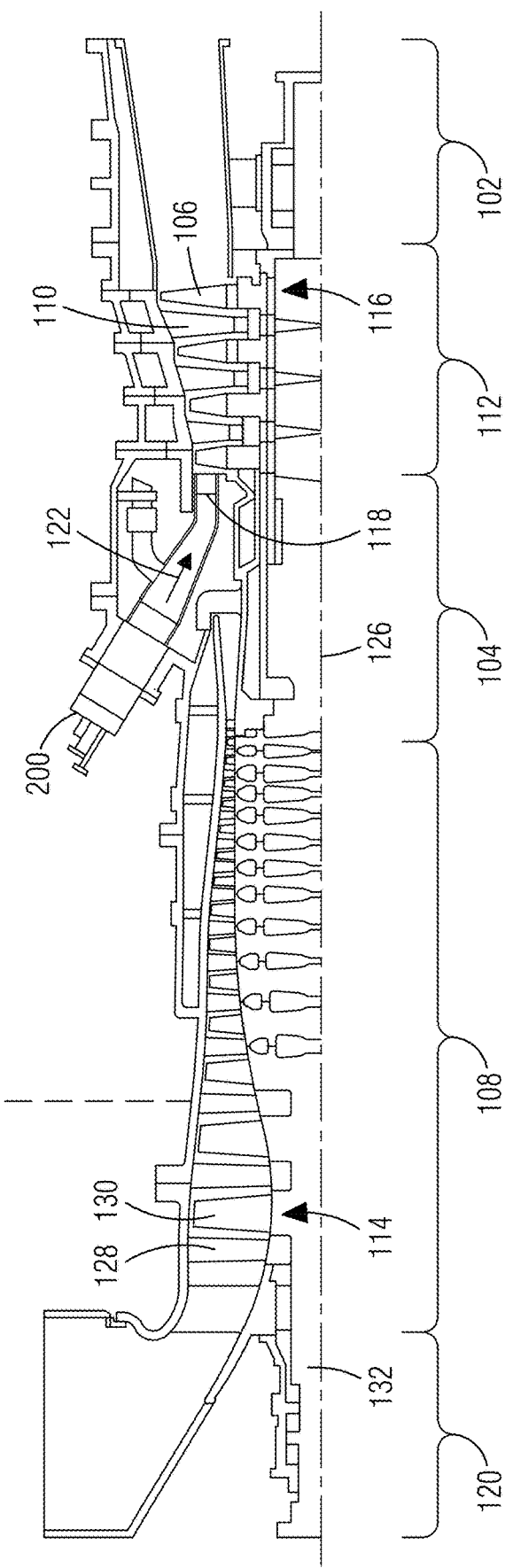
FIG. 1 is a longitudinal cross-sectional view of a gas turbine engine 100 taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 108, a combustion section 104, and a turbine section 112 arranged along a central axis 126. The compressor section 108 includes a plurality of compressor stages 114 with each compressor stage 114 including a set of rotating blades 130 and a set of stationary vanes 128 or adjustable guide vanes. A rotor 132 supports the rotating blades 130 for rotation about the central axis 126 during operation. In some constructions, a single one-piece rotor 132 extends the length of the gas turbine engine 100 and is supported for rotation by a bearing at either end. In other constructions, the rotor 132 is assembled from several separate spools that are attached to one another or may include multiple disk sections that are attached via a bolt or plurality of bolts.

The compressor section 108 is in fluid communication with an inlet section 120 to allow the gas turbine engine 100 to draw atmospheric air into the compressor section 108. During operation of the gas turbine engine 100, the compressor section 108 draws in atmospheric air and compresses that air for delivery to the combustion section 104. The illustrated compressor section 108 is an example of one compressor section 108 with other arrangements and designs being possible.

In the illustrated construction, the combustion section 104 includes a plurality of separate combustors 200 that each operate to mix a flow of fuel with the compressed air from the compressor section 108 and to combust that air-fuel mixture to produce a flow of high temperature, high pressure combustion gases or exhaust gas 122. Of course, many other arrangements of the combustion section 104 are possible.

The turbine section 112 includes a plurality of turbine stages 116 with each turbine stage 116 including a number of rotating turbine blades 106 and a number of stationary turbine vanes 110. The turbine stages 116 are arranged to receive the exhaust gas 122 from the combustion section 104 at a turbine inlet 118 and expand that gas to convert thermal and pressure energy into rotating or mechanical work. The turbine section 112 is connected to the compressor section 108 to drive the compressor section 108. For gas turbine engines 100 used for power generation or as prime movers, the turbine section 112 is also connected to a generator, pump, or other device to be driven. As with the compressor section 108, other designs and arrangements of the turbine section 112 are possible.

An exhaust portion 102 is positioned downstream of the turbine section 112 and is arranged to receive the expanded flow of exhaust gas 122 from the final turbine stage 116 in the turbine section 112. The exhaust portion 102 is arranged to efficiently direct the exhaust gas 122 away from the turbine section 112 to assure efficient operation of the turbine section 112. Many variations and design differences are possible in the exhaust portion 102. As such, the illustrated exhaust portion 102 is but one example of those variations.

A control system 124 is coupled to the gas turbine engine 100 and operates to monitor various operating parameters and to control various operations of the gas turbine engine 100. In preferred constructions the control system 124 is typically micro-processor based and includes memory devices and data storage devices for collecting, analyzing, and storing data. In addition, the control system 124 provides output data to various devices including monitors, printers, indicators, and the like that allow users to interface with the control system 124 to provide inputs or adjustments. In the example of a power generation system, a user may input a power output set point and the control system 124 may adjust the various control inputs to achieve that power output in an efficient manner.

The control system 124 can control various operating parameters including, but not limited to variable inlet guide vane positions, fuel flow rates and pressures, engine speed, valve positions, generator load, and generator excitation. Of course, other applications may have fewer or more controllable devices. The control system 124 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
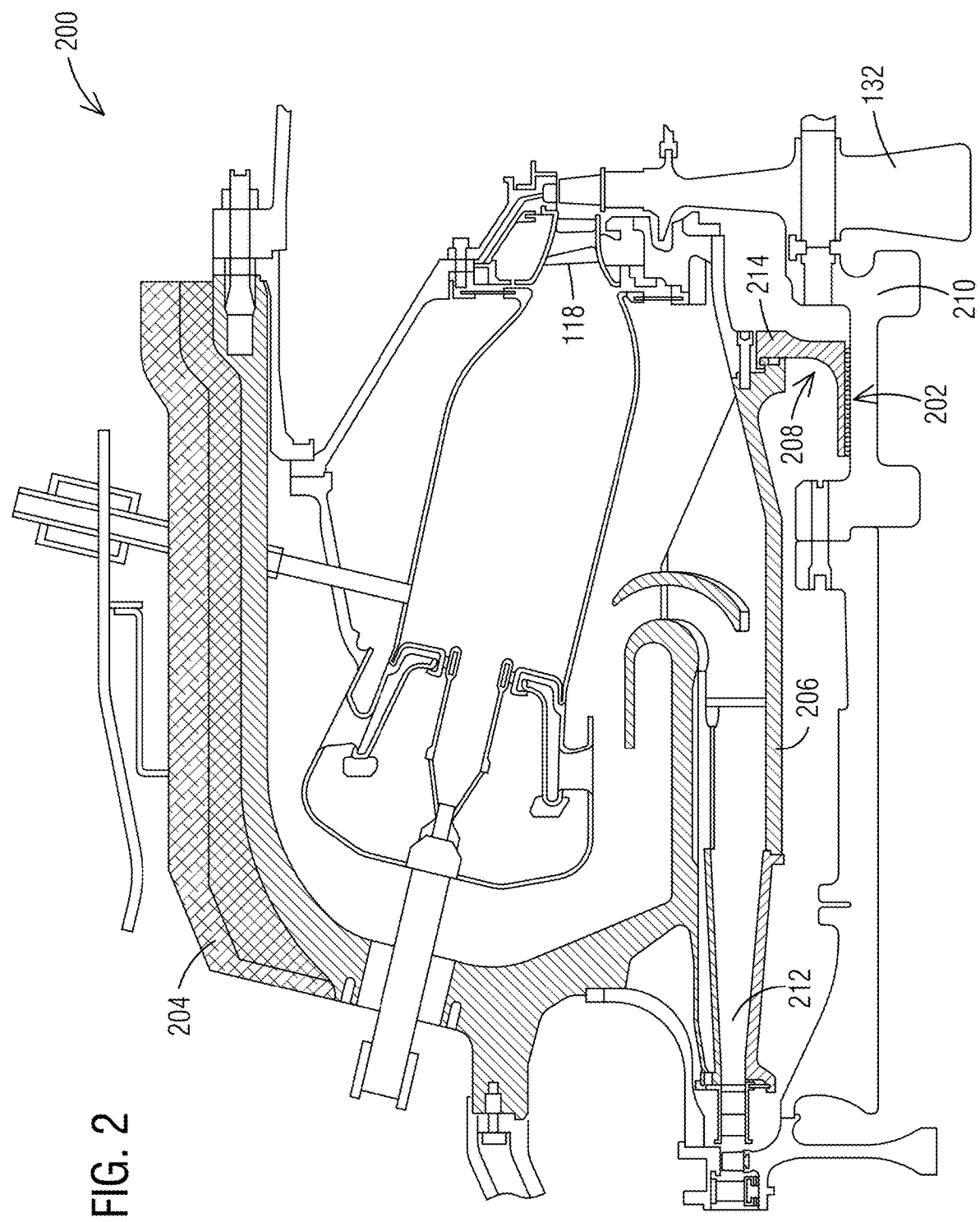
FIG. 2 is an enlarged cross-sectional view of a portion of the gas turbine of FIG. 1 better illustrating one of the combustors.

As discussed, the combustion section 104 may include multiple combustors 200 to provide the necessary combustion for the gas turbine engine 100. FIG. 2 illustrates an area of the combustion section 104, including one of the combustors 200 in greater detail. As illustrated, an outer casing 204 surrounds and encloses the combustor 200 while an inner casing 206 at least partially surrounds the rotor 132 to separate it from direct contact with the compressed air exiting the compressor section 108 at a compressor outlet 212, or the exhaust gas 122 entering the turbine stage 116 at the turbine inlet 118.

A central casing 208 is provided to enhance the protection of the rotor 132 from the exhaust gas 122. The central casing 208 includes a number of seal segments 214 that are each fixedly attached to the inner casing 206 and cooperate with an adapter 210, which is a portion of the rotor 132 to form a seal 202 therebetween.

Figure 3:
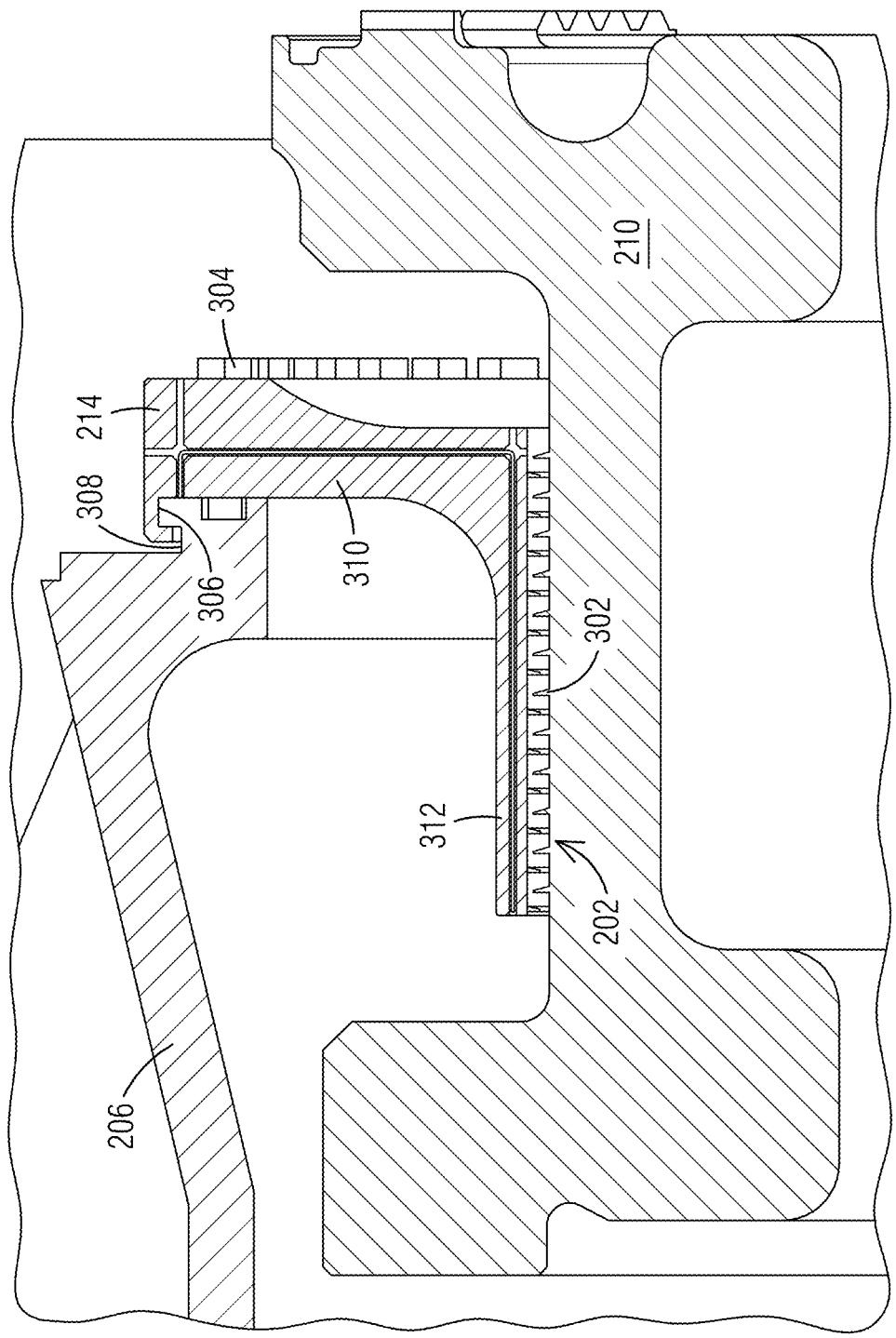
FIG. 3 is an enlarged cross-sectional view of a portion of the gas turbine of FIG. 1 better illustrating a center seal.

FIG. 3 is a cross-sectional view of the area around the seal 202 that better illustrates the various components. As illustrated, each seal segment 214 includes a planar leg 310 that defines a substantially planar portion of the seal segment 214 and an axial leg 312 that extends in an axial direction or a substantially axial direction from the planar leg 310. Thus, each seal segment 214 resembles an angle member or L-shaped member in cross-section. The planar leg 310 includes a seal segment hook 306 that is arranged to engage an inner casing hook 308 that is formed as part of the inner casing 206. The seal segment hook 306 engages the inner casing hook 308 to vertically support the seal segment 214. The planar leg 310 also defines a plurality of apertures each arranged to receive a fastener 304. The fasteners 304 are arranged to threadably engage the inner casing 206 to fixedly attach each seal segment 214 to the inner casing 206.

The axial leg 312 extends along an axial length of the adapter 210 and supports a series of seal teeth 302 arranged in a desired pattern. The seal teeth 302 of the axial leg 312 cooperate with seal teeth 302 formed on or installed in the adapter 210. In the illustrated construction, the seal teeth 302 are arranged to define a full labyrinth (seal tooth 302 interfere in the radial direction) with the seal teeth 302 forming an interlocking pattern. Of course, other patterns or arrangements could be employed if desired such as an open labyrinth.

Figure 4:
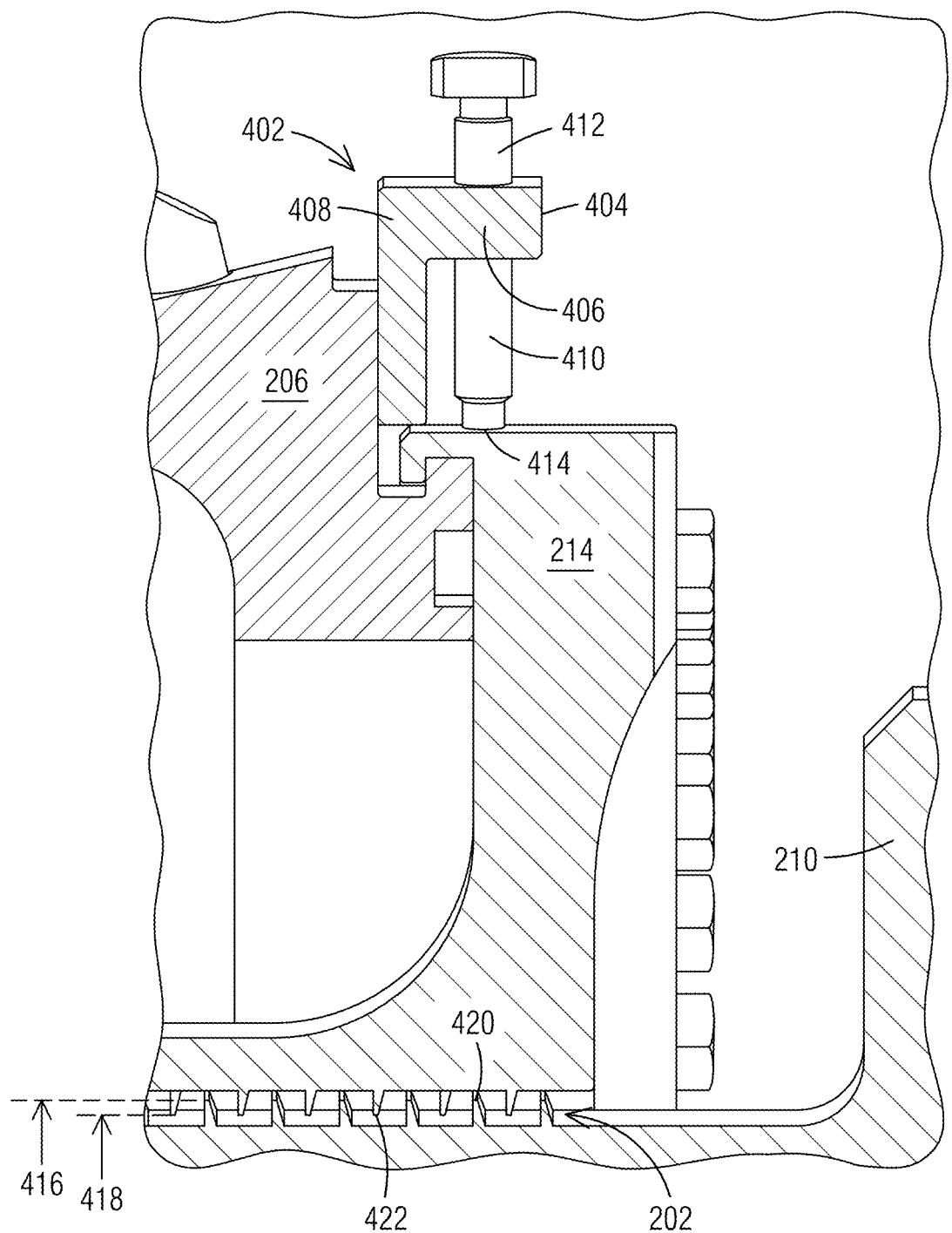
FIG. 4 is a cross-sectional view of the center seal of FIG. 3 including an alignment tool.

FIG. 4 illustrates the seal segment 214 engaged with the inner casing 206 to form the seal 202 with the adapter 210. In addition, an alignment tool 402 is attached to the inner casing 206 for use in properly positioning and aligning the seal segment 214 as will be discussed in greater detail. The alignment tool 402 includes a partial annular ring 404 that is defined by a support leg 406 and a mounting flange 408 that are arranged in an L-shape in cross-section with other shapes and arrangements being possible. In the illustrated construction, the support leg 406 and the mounting flange 408 are formed as one piece and are inseparable without destroying the partial annular ring 404. However, other constructions could include a partial annular ring 404 formed by removable attaching the support leg 406 to the mounting flange 408.

As will be discussed in greater detail with regard to FIG. 5, the mounting flange 408 is arranged to abut the inner casing 206 and includes a plurality of apertures for fixedly attaching the alignment tool 402 to the inner casing 206. In addition, the support leg 406 includes a plurality of apertures each arranged to receive a jack bolt 410. In preferred constructions, the aperture is threaded and in more preferred constructions, a fine thread is employed to allow for small adjustments of the jack bolt 410 as will be discussed in greater detail.

Each jack bolt 410 includes a mating end 414 that is arranged to engage an outer surface of the seal segment 214. An optional locking collar 412 can be threadably engaged to each jack bolt 410 and can be used to lock the position of the associated jack bolt 410 if desired.

With continued reference to FIG. 4, one arrangement of the seal 202 that is formed between the rotor 132 or adapter 210 and each of the seal segments 214 is illustrated as a non-see-through labyrinth seal. As is illustrated, the adapter 210 includes a plurality of radially extending rotor seal tips 420 that with each rotor seal tip 420 axially spaced apart from the adjacent rotor seal tip 420. Each of the rotor seal tips 420 defines a rotor tip diameter 416. A similar arrangement of segment seal tips 422 is positioned on or formed as part of each of the seal segments 214. The segment seal tips 422 extend radially to define a segment tip diameter 418 and are axially spaced apart from one another. The rotor tip diameter 416 of at least one of the rotor seal tips 420 is larger than the segment tip diameter 418 of at least one of the segment seal tips 422 to define the non-see-through labyrinth seal. The rotor seal tips 420 and the segment seal tips 422 are also arranged in an alternating fashion to define an alternating leakage path that results in a more efficient seal 202.

Figure 5:
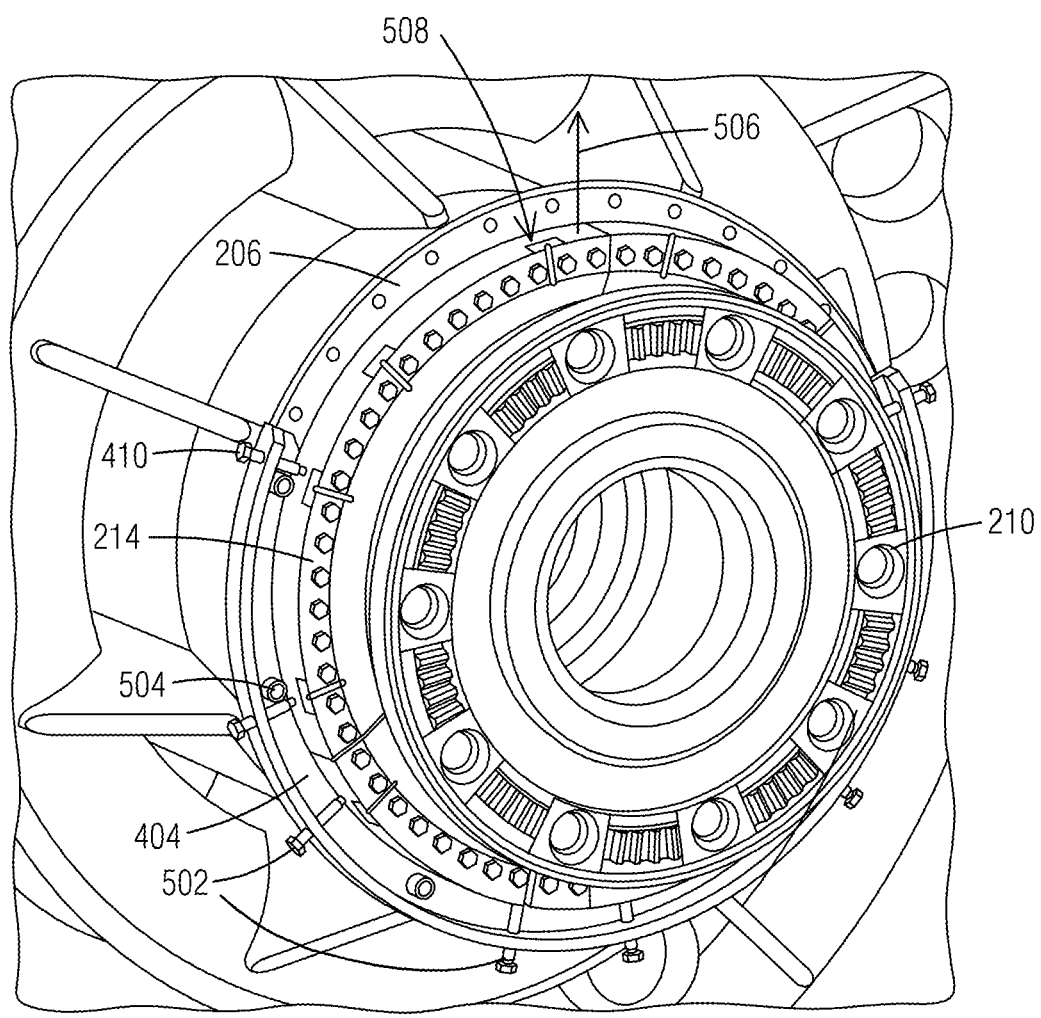
FIG. 5 is a perspective view of the center seal of FIG. 3 with the alignment tool of FIG. 4 attached to the inner casing.

FIG. 5 is a perspective view illustrating the alignment tool 402 attached to the inner casing 206. As can be seen, the partial annular ring 404 extends in an arc that is between 190 degrees and 350 degrees with an arc of about 240 degrees being preferred. The size of the arc is not critical so long as the gap or open portion 508 is large enough to allow for the passage of one of the seal segments 214. Thus, in a construction that includes six seal segments 214 to complete the 360-degree seal 202, such as that illustrated in FIG. 5, the gap or open portion 508 should be at least sixty degrees. In the illustrated construction, the open portion 508 is large enough for two seal segments 214 such that the arc is about 240 degrees (+/−10 degrees).

A number of mounting fasteners 504 fixedly connect the partial annular ring 404 to the inner casing 206 such that the open portion 508 is facing in a vertical up direction 506. Preferably, the open portion 508 is centered at a top dead center position as indicated by the arrow showing the vertical up direction 506.

The jack bolts 410 are engaged with the partial annular ring 404 and are grouped into pairs of jack bolts 502. The pairs of jack bolts 502 are arranged such that each jack bolt 410 of a pair of jack bolts 502 engages one end of a seal segment 214. In this way each jack bolt 410 of the pair of jack bolts 502 can be adjusted to radially position (i.e., a radial distance from the central axis 126) each end of the seal segment 214 to which the pair of jack bolts 502 is associated.

The operation and use of the alignment tool 402 will be described with reference to FIG. 6. The first step for using the alignment tool 402 during an alignment process 600 is to attach the partial annular ring 404 to the inner casing 206 in a desired radial position and with the open portion 508 facing upward. A first seal segment 214 is slidably attached to the inner casing 206 (block 604) by engaging the seal segment hook 306 with the inner casing hook 308 in the open portion 508 of the partial annular ring 404. More specifically, the first seal segment 214 can be positioned at a top dead center position where the engaged seal segment hook 306 and inner casing hook 308 support the seal segment 214. The open portion 508 of the partial annular ring 404 allows one to position the seal segment 214 in or very near the desired axial position (i.e., position along the central axis 126) and to radially move the seal segment 214 into a position in which the seal segment hook 306 and the inner casing hook 308 are engaged with one another. The arrangement of the seal segment hook 306 and the inner casing hook 308 provides support for a seal segment 214 only when the seal segment 214 is positioned in the upper portion of the arc but allows one to slide the seal segment 214 around the arc. The user then rotates the seal segment 214 toward its desired operating position. As the seal segment 214 moves toward and into the lower portion of the arc, the engaged seal segment hook 306 and inner casing hook 308 cease to provide adequate support for the seal segment 214. However, at this point, the seal segment 214 is within or at least partially within the partial annular ring 404 such that the jack bolts 410 can engage the outer surface of the seal segment 214 and support the seal segment 214 at or near its desired radial position (see block 606 and block 608). The partial annular ring 404 is positioned and the jack bolts 410 are arranged such that each pair of jack bolts 502 supports one and only one seal segment 214 when the seal segments 214 are in their operating positions. It is important to note that more than two jack bolts 410 could be employed to support and position each seal segment 214 if desired.

As outlined in block 610, the user next adjusts each jack bolt 410 of the pair of jack bolts 502 that are supporting the seal segment 214 to radially position the seal segment 214. Rotating each jack bolt 410 operates to position the associated end of the seal segment 214 radially closer or further away from the central axis 126. By employing fine threads, small adjustments of the radial position can be made by rotating the jack bolts 410. In addition, depth micrometers could be employed as jack bolts 410 or separate from the jack bolts 410 to allow for accurate measurements of the position of the seal segment 214 or of the change in position of the seal segment 214.

Once the seal segment 214 is in the desired radial position, some or all the fasteners 304 can be tightened to fixedly attach the seal segment 214 to the inner casing 206. As noted in block 614, the alignment process 600 continues by repeating the steps of block 604 through block 612 with another seal segment 214.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An apparatus arranged to form a seal between an inner casing and a rotor, the apparatus comprising:
   a plurality of seal segments, each seal segment arranged to define a partial arc that extends around a portion of a central axis of the rotor and includes a first hook having an open portion facing the central axis and arranged to engage a second hook coupled to the inner casing;
   an alignment tool removably connected to the inner casing, the alignment tool including a partial annular ring that extends in an arc between 190 degrees and 350 degrees;
   a plurality of jack bolt pairs movably coupled to the alignment tool, each jack bolt pair arranged to engage one of the seal segments of the plurality of seal segments to position the seal segment in a desired radial position with respect to the rotor; and
   a plurality of fasteners arranged to removably connect each seal segment of the plurality of seal segments to the inner casing.

2. The apparatus of claim 1, wherein the arc is 240 degrees.

3. The apparatus of claim 1, wherein the plurality of seal segments includes six individual seal segments, and the plurality of jack bolt pairs includes four jack bolt pairs arranged to support only four of the six seal segments.

4. The apparatus of claim 3, wherein the two seal segments not supported by one of the plurality of jack bolt pairs are at least partially supported by the engagement of the first hook and the second hook.

5. The apparatus of claim 1, wherein each jack bolt is threadably engaged with the alignment tool.

6. The apparatus of claim 1, wherein the rotor includes a plurality of radially extending rotor seal tips that are spaced apart from one another, a first of the rotor seal tips defines a first diameter, and wherein each seal segment defines a plurality of radially extending segment seal tips that are spaced apart from one another, a first of the segment seal tips defines a second diameter.

7. The apparatus of claim 6, wherein the plurality of radially extending rotor seal tips and the plurality of radially extending segment seal tips are arranged axially in an alternating fashion such that each of the rotor seal tips is spaced apart from the segment seal tips in an axial direction, and where the first diameter is larger than the second diameter to define a non-see-through labyrinth seal between the rotor and the seal segments.

* * * * *